(12) United States Patent
Zhu et al.

(10) Patent No.: US 11,914,128 B2
(45) Date of Patent: Feb. 27, 2024

(54) LIGHT CONDENSING DEVICE FOR INSPECTING QUALITY INSIDE FRUITS AND VEGETABLES, SYSTEM COMPRISING SAME, AND USE METHOD THEREOF

(71) Applicant: REEMOON TECHNOLOGY CO., LTD., Ganzhou (CN)

(72) Inventors: Yi Zhu, Jiangxi (CN); Er Zhu, Jiangxi (CN)

(73) Assignee: REEMOON TECHNOLOGY CO., LTD., Ganzhou (CN)

( * ) Notice: Subject to any disclaimer, the term of this patent is extended or adjusted under 35 U.S.C. 154(b) by 666 days.

(21) Appl. No.: 17/259,095

(22) PCT Filed: May 31, 2019

(86) PCT No.: PCT/CN2019/089476
§ 371 (c)(1),
(2) Date: Jan. 8, 2021

(87) PCT Pub. No.: WO2020/038043
PCT Pub. Date: Feb. 27, 2020

(65) Prior Publication Data
US 2021/0318529 A1   Oct. 14, 2021

(30) Foreign Application Priority Data

Aug. 22, 2018   (CN) .......................... 201810958224.1

(51) Int. Cl.
| | | |
|---|---|---|
| *G01N 21/84* | (2006.01) | |
| *G02B 19/00* | (2006.01) | |
| *G01N 21/25* | (2006.01) | |

(52) U.S. Cl.
CPC ....... *G02B 19/0047* (2013.01); *G01N 21/255* (2013.01); *G01N 21/84* (2013.01); *G02B 19/0028* (2013.01)

(58) Field of Classification Search
CPC ............ G02B 19/0047; G02B 19/0028; G01N 21/255; G01N 21/84; G01N 2021/845;
(Continued)

(56) References Cited

U.S. PATENT DOCUMENTS

| | | | | |
|---|---|---|---|---|
| 5,517,278 A | * | 5/1996 | Takahara | ............... H04N 23/53 348/E5.025 |
| 6,137,581 A | | 10/2000 | Kimura et al. | |

(Continued)

FOREIGN PATENT DOCUMENTS

| | | |
|---|---|---|
| CN | 2874482 Y | 2/2007 |
| CN | 203405276 U | 1/2014 |

(Continued)

OTHER PUBLICATIONS

International Search Report (including English Translation) and Written Opinion with regard to PCT/CN2019/089476 dated Aug. 22, 2019.

(Continued)

*Primary Examiner* — Abdullahi Nur
(74) *Attorney, Agent, or Firm* — BCF LLP

(57) ABSTRACT

A light condensing device for inspecting the quality inside fruits and vegetables, resolving problems in which manually holding fruits for inspection is inefficient and cannot be used in large-scale fruit packaging production. The device comprises a housing, a halogen lamp, a diaphragm, a plano-convex lens support a first plano-convex lens, a reflector lens fixing plate, a reflector, a plano-convex lens fixing plate, and a second plano-convex lens. The housing is a sealed and non-transparent housing. The halogen lamp is fixedly disposed at a left end of the housing, and extends into an inner portion of the housing. A pluggable diaphragm is disposed at the right side of the halogen lamp, and is used to guide a lighting direction of the halogen lamp. The diaphragm (Continued)

passes through the inner portion of the housing. The plano-convex lens support is fixedly disposed inside the housing at the right side of the diaphragm.

20 Claims, 4 Drawing Sheets

(58) Field of Classification Search
CPC ... G01N 2021/8466; G01N 2201/0618; G01N 2201/0638; G01N 21/01; G01N 2021/0112; G01N 2021/015
See application file for complete search history.

(56) References Cited

U.S. PATENT DOCUMENTS

| | | | | |
|---|---|---|---|---|
| 6,264,331 | B1* | 7/2001 | Sawai | G03B 21/006 353/31 |
| 7,841,727 | B2* | 11/2010 | Lin | G03B 21/2066 396/505 |
| 2006/0044527 | A1* | 3/2006 | Watanabe | H04N 9/3114 348/E5.142 |
| 2007/0263173 | A1* | 11/2007 | Reimer | A61B 3/12 351/221 |
| 2010/0045982 | A1* | 2/2010 | Tsuneta | G01N 15/14 356/338 |

FOREIGN PATENT DOCUMENTS

| | | |
|---|---|---|
| CN | 104251837 A | 12/2014 |
| CN | 106323909 A | 1/2017 |
| CN | 108663327 A | 10/2018 |
| CN | 208688967 U | 4/2019 |
| EP | 0957353 A2 | 11/1999 |
| JP | 2009098033 A | 5/2009 |

OTHER PUBLICATIONS

English Abstract for CN2874482 retrieved on Espacenet on Jan. 8, 2021.
English Abstract for CN104251837 retrieved on Espacenet on Jan. 8, 2021.
English Abstract for CN106323909 retrieved on Espacenet on Jan. 8, 2021.
English Abstract for CN108663327 retrieved on Espacenet on Jan. 8, 2021.
English Abstract for CN203405276 retrieved on Espacenet on Jan. 8, 2021.
English Abstract for CN208688967 retrieved on Espacenet on Jan. 8, 2021.
English Abstract for JP2009098033 retrieved on Espacenet on Jan. 8, 2021.

* cited by examiner

LIGHT CONDENSING DEVICE FOR INSPECTING QUALITY INSIDE FRUITS AND VEGETABLES, SYSTEM COMPRISING SAME, AND USE METHOD THEREOF

CROSS-REFERENCE TO RELATED APPLICATIONS

The present application is a National Stage of International Application No. PCT/CN2019/089476, filed on May 31, 2019, which claims priority to Chinese Patent Application No. 201810958224.1, entitled "Light Concentrating Device for Inspecting Internal Quality of Fruits and Vegetables", filed with the Chinese Patent Office on Aug. 22, 2018, the entire contents of each application listed in this paragraph are incorporated herein by reference.

TECHNICAL FIELD

The present disclosure pertains to a light concentrating device, and particularly to a light concentrating device for inspecting internal quality of fruits and vegetables (i.e., a light condensing device for inspecting quality inside fruits and vegetables).

BACKGROUND ART

With the continuous progress and development of the society, people have more and more stringent requirements for their own quality of life. In addition to daily fitness exercises, people also take a lot of fruits and vegetables to prevent the human body from lacking vitamins and other nutrients. In order to ensure that the daily fruit intake is sufficient, fruits will be stored in the refrigerator at home. In addition to strict control over the amount of fruits consumed, people will also have requirements on the type of fruits consumed, for example, the contents of vitamins contained in different fruits (e.g. navel oranges, apples, etc.) are different, causing that people would buy some high-vitamin fruits on purpose, to prevent that their own vitamin intake is insufficient; moreover, people also have certain requirements for the freshness of fruits. Under the condition of abundant and satisfying substances, during the process of selecting fruits, people would also have more stringent standard for the freshness of fruits, in addition to standards targeting at contents of nutrients in fruits.

In response to people's demands for the quantity of different fruits and the freshness of fruits, fruit shops that specialize in fresh fruit sales in the same city and also carry out related sales online have been opened, and fruits ordered by customers on the Internet or via APP are delivered from the orchard to the customers as quickly as possible, wherein not only the freshness of fruits is guaranteed, but also people's various needs for fruit quality are satisfied. This has also led some businesspersons to invest in the fruit industry or related industries, such as fruit planting, fruit packaging, and fruit reproduction.

For the fruit production and packaging industry, before packaging the fruits, it is often necessary to ensure good quality of the fruits in the boxes and prevent the occurrence of rot inside the fruits. However, rot and damages inside fruits cannot be directly observed through naked eyes, thus, there are still few fruits having unqualified internal quality in a whole box of completely packaged fruits. How to lower and reduce the amount of fruits having unqualified internal quality in each box of fruits through technical means is a big problem encountered by technicians in the field of fruit packaging and production. Traditional internal inspection of fruits is performed by adopting the destructive experiment of cutting the fruits for inspection and judgement, or by utilizing a sugar meter to perform non-destructive quality inspection for the interior of fruits, but the hand-held sugar meter needs to be hand-held during use, to inspect the internal quality of fruits, such a manual inspection method is too inefficient and easily causes fatigue of inspectors, and is not suitable for internal quality inspection of a large amount of fruits in industrial production.

SUMMARY

The present disclosure provides a light concentrating device for inspecting internal quality of fruits and vegetables, and can solve the problems, e.g. previous manual hand-held fruit inspection is inefficient and cannot be applied to large-scale fruit packaging and production; meanwhile, changes in inspection accuracy caused by manual operation of inspection instrument for a long time can be avoided, hereby achieving the purpose of inspecting the internal quality of fruits in real time during large-scale fruit production, and economizing manpower and material resources.

The present disclosure provides such a light concentrating device for inspecting internal quality of fruits and vegetables, comprising: a housing, a halogen lamp, a diaphragm, a planoconvex lens holder, a first planoconvex lens, a reflector fixing plate, a reflector, a planoconvex lens fixing plate, and a second planoconvex lens, wherein the housing is a sealed opaque shell, the halogen lamp is fixedly mounted on the left end of the housing, the halogen lamp extends into the interior of the housing, the right side of the halogen lamp is provided with a pluggable diaphragm for guiding the direction of the light rays of the halogen lamp, the diaphragm passes throughout the interior of the housing, the planoconvex lens holder is fixedly mounted in the housing on the right side of the diaphragm, the first planoconvex lens for primary concentration of light rays is mounted on the planoconvex lens holder, the reflector fixing plate is fixedly mounted on the right side of the first planoconvex lens, the reflector for reflecting light rays is mounted on the reflector fixing plate, the planoconvex lens fixing plate is fixedly mounted under the reflector, the second planoconvex lens for secondary concentration of light rays is mounted on the planoconvex lens fixing plate, and the second planoconvex lens extends out of the housing.

Optionally, the light concentrating device for inspecting internal quality of fruits and vegetables further comprises: a fixing plate, a motor, a shading plate, and a thermal baffle, wherein the fixing plate is mounted on the external surface of the housing, the motor is fixedly mounted on the fixing plate, the shading plate configured for shielding light rays via secondary concentration is in connection with the output shaft of the motor, and the thermal baffle is mounted on the shading plate. The shading plate can be driven to swing through the movement of the motor. When the light rays are too intensive or the fruit conveying device stops working, the motor is utilized to drive the thermal baffle on the shading plate to move to a designated position, hereby blocking the irradiation of light rays on fruits. In this way, not only the occurrence of situation where the lighting device is switched off to protect the fruits is avoided, but it can also be ensured that fruits would not be scorched or damaged by the light rays.

Optionally, the housing is made of aluminum alloy. The adoption of an aluminum alloy material can ensure a light housing, reduce the bearing force exerted on the mounting position by the device, and quickly dissipate heat inside the housing, while achieving good sealing and light ray isolating effects. Optionally, the housing is made of a metal, and the housing may also be made of stainless steel.

Optionally, the thermal baffle is a thermal insulating fiberboard. The adoption of a fiberboard as thermal insulating material can not only enable the fiberboard to achieve a good thermal insulating effect, but also reduce the weight of the thermal baffle. Optionally, the thermal baffle is a thermal insulating asbestos board.

Optionally, the halogen lamp has a power not less than 70 W.

Optionally, there is an aperture in the diaphragm, so as to be able to limit and focus the light emitted by the halogen lamp.

Optionally, the reflector is mounted in an oblique manner, so as to reflect the light rays passing through the first planoconvex lens, such that the light rays vertically irradiate the second planoconvex lens.

The present disclosure provides a system for inspecting internal quality of fruits and vegetables, wherein the system comprises a detection device and a light concentrating device for inspecting internal quality of fruits and vegetables, wherein the detection device is able to perform corresponding optical signal detection for light spots irradiated on fruits, and accordingly judge whether there is a quality problem inside the fruits.

Optionally, the detection device further includes a detection device sensor, which is able to input an electric signal to the motor when it is detected that the lamplight from the halogen lamp irradiates the surface of the fruits for a long time, such that the motor drives the shading plate and the thermal baffle to move, and the motor stops moving after that the shading plate and the thermal baffle are moved to a position between the second planoconvex lens and the fruits, such that the shading plate and the thermal baffle block the light rays passing by the second planoconvex lens.

Optionally, the detection device is composed of STM32, ARM single chip microcomputer, or PLC.

Optionally, a control program is loaded into the detection device, and the control program is able to judge an optical signal collected by the detection device, so as to determine whether there is a quality problem inside the fruits.

Optionally, the system for inspecting internal quality of fruits and vegetables further comprises a principal computer, which is able to correspondingly count and mark fruits having damaged internal quality.

The present disclosure further provides a method for inspecting internal quality of fruits and vegetables, wherein the light concentrating device for inspecting internal quality of fruits and vegetables according to the present disclosure is mounted next to a conveying device for transporting fruits; the power supply of the halogen lamp is switched on, such that the light rays emitted by the halogen lamp pass through the diaphragm, are focused by the first planoconvex lens, and pass through the second planoconvex lens after passing by the reflector and are then focused on the surface of the fruits; and corresponding optical signal detection is performed for light spots irradiated on the fruits through the detection device, hereby judging whether there is a quality problem inside the fruits.

Optionally, the method for inspecting internal quality of fruits and vegetables further comprises: inputting an electric signal to the motor when it is detected by a detection device sensor that the lamplight irradiates the surface of the fruits for a long time, such that the motor drives the shading plate and the thermal baffle to move, and the motor stops moving after that the shading plate and the thermal baffle are moved to a position between the second planoconvex lens and the fruits, such that the shading plate and the thermal baffle block the light rays passing by the second planoconvex lens, hereby ensuring that the appearance of the fruits would not be scorched and damaged by the light rays.

Optionally, the method for inspecting internal quality of fruits and vegetables further comprises using a principal computer, which is able to correspondingly count and mark fruits having damaged internal quality.

Working principle: Before using the device, the device is firstly mounted and placed above a conveyor belt for transporting fruits; after adjusting the distance between the device and the conveyor belt, the power supply of the halogen lamp is then switched on and the halogen lamp is turned on, such that the lamplight of the halogen lamp passes through an aperture on the diaphragm and irradiates the planoconvex lens; after that the light rays of the halogen lamp are focused by the planoconvex lens and irradiate on the reflector, the light rays are reflected to another planoconvex lens by the reflector, such that the light rays are concentrated on fruits and form light spots having sufficient brightness; at last, the quality inside the fruits is analyzed through a detection device for analyzing light spots. When the fruits on the conveyor belt passes under the device, the lamplight of the halogen lamp irradiates on the fruits after being concentrated, and corresponding optical signal detection is performed for light spots on the fruits by utilizing the detection device, hereby accordingly judging whether there is a quality problem inside the fruits.

When the sensor on the detection device detects a light spot signal on the surface of a certain fruit, and then it is discovered through analysis that there is an issue regarding the internal quality thereof, the optical signal is converted into an electric signal and then transmitted to the principal computer, and fruits having internal quality problems are counted and marked.

In the present disclosure, through some improvements, the device is enabled to be suitable for industrial, large-scale production and packaging of fruits, and achieve the purpose of continuously measuring the internal quality of fruits. By changing different pluggable diaphragms, the device changes the size of light spots formed by light rays projected on the surface of fruits, such that the device can have a better light concentrating effect when inspecting the same kind of fruits having different sizes, while a relatively high inspection accuracy of the device is ensured, and the occurrence of situation where the device cannot adjust light concentration according to the diameter grades of different fruits during the automatic inspection process is avoided. The light concentration for two times realized by utilizing a planoconvex lens enables light rays to form light spots having clear brightness effects on fruits, which effectively avoids the occurrence of situation where the sensor cannot detect an effective light spot signal due to a poor light concentrating effect.

In a word, the device avoids the occurrence of situation of manual inspection of fruits, improves the efficiency of internal quality inspection of fruits, and solves the problem that an existing inspection device cannot measure the internal quality of fruits during the large-scale packaging and production of fruits; at the same time, changes in inspection accuracy caused by manual operation of inspection instrument for a long time are avoided, hereby achieving the purpose of inspecting the internal quality of fruits in real time during large-scale fruit production, and economizing manpower and material resources.

BRIEF DESCRIPTION OF THE DRAWINGS

In order to more clearly describe the technical solutions of the embodiments of the present disclosure or in the prior art, the figures required to be used in the description of the embodiments or the prior art will be simply presented below. Clearly, the figures described below merely show certain embodiments of the present disclosure, and for a person ordinarily skilled in the art, other figures could be obtained according to these figures without inventive efforts.

Reference signs in the figures: 1-housing, 2-halogen lamp, 3-diaphragm, 4-planoconvex lens holder, 5-first planoconvex lens, 6-reflector fixing plate, 7-reflector, 8-planoconvex lens fixing plate, 9-second planoconvex lens, 10-fixing plate, 11-motor, 12-shading plate, 13-thermal baffle, 14-fruits, and 15-light rays.

DETAILED DESCRIPTION OF THE EMBODIMENTS

In order to make the technical means, creative features, achieved objects and effects of the implementation of the present disclosure easy to understand, the technical solutions of the embodiments of the present disclosure will be clearly and comprehensively described below with reference to the accompanying drawings, so as to further explain the present disclosure. Clearly, the described embodiments are merely some of the embodiments of the present disclosure, but not all the embodiments.

Figure 1:
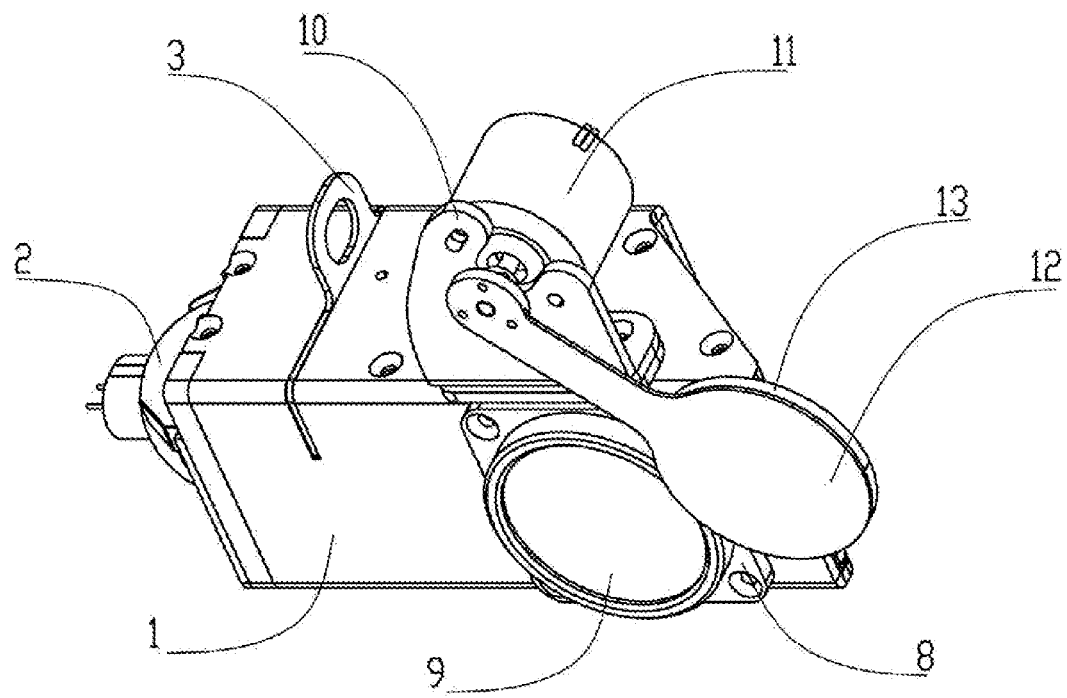
FIG. 1 shows an external view of an embodiment of the present disclosure.
Figure 2:
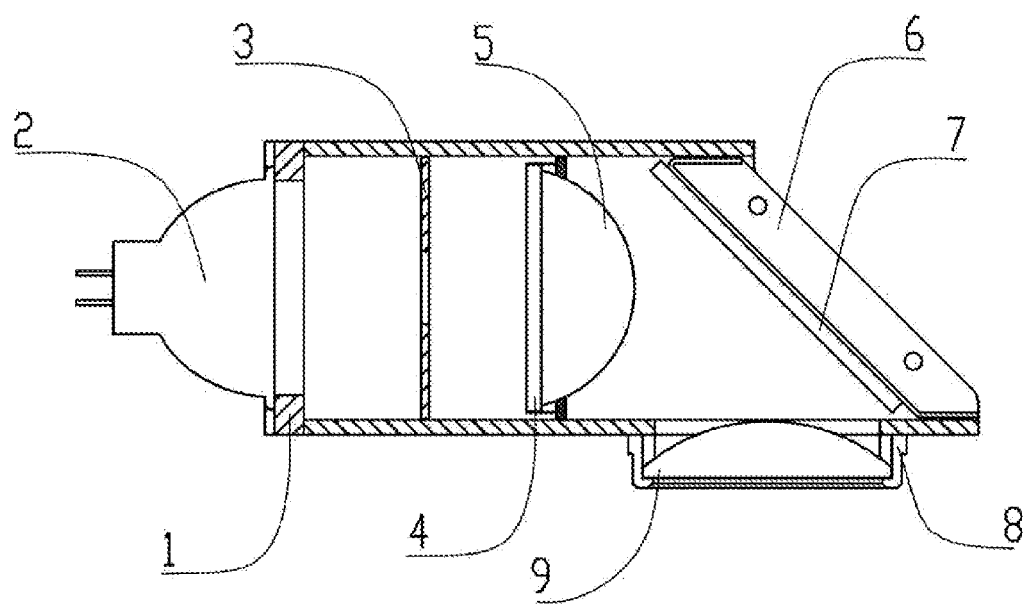
FIG. 2 shows a structural schematic view of an embodiment of the present disclosure.
Figure 3:
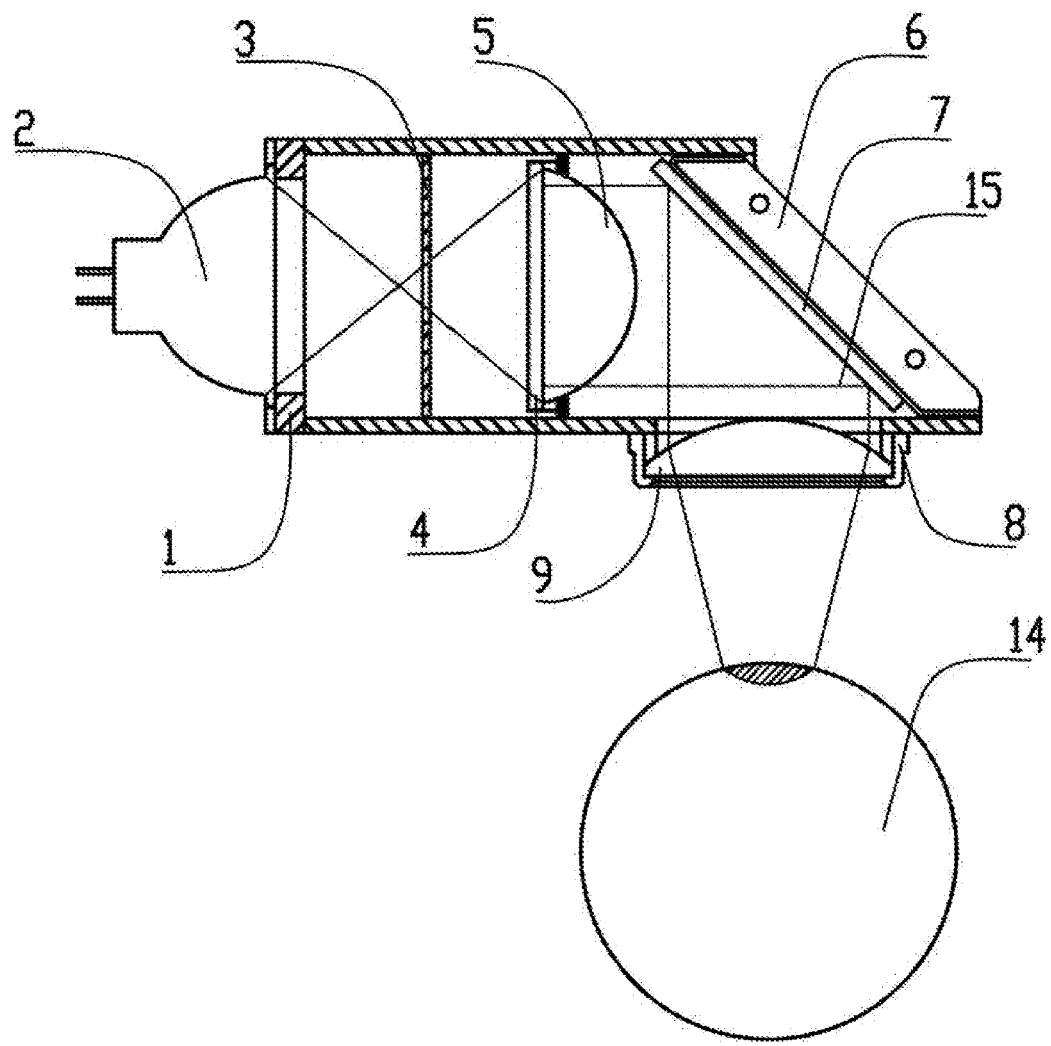
FIG. 3 shows the working principle diagram of an embodiment of the present disclosure.
Figure 4:
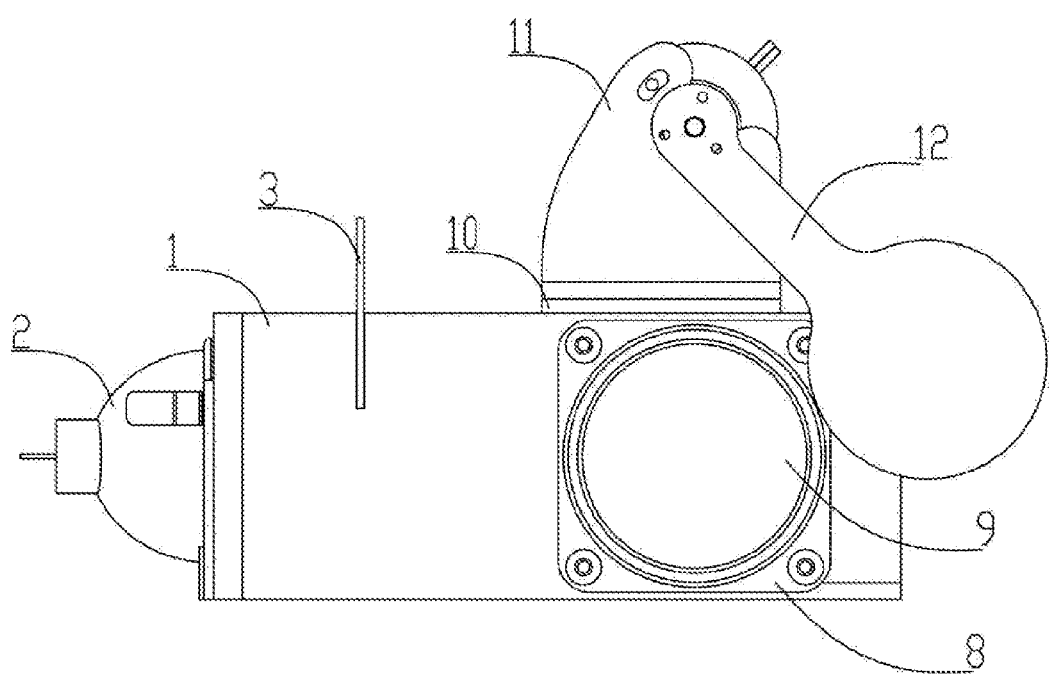
FIG. 4 shows a front view of an embodiment of the present disclosure.
Figure 5:
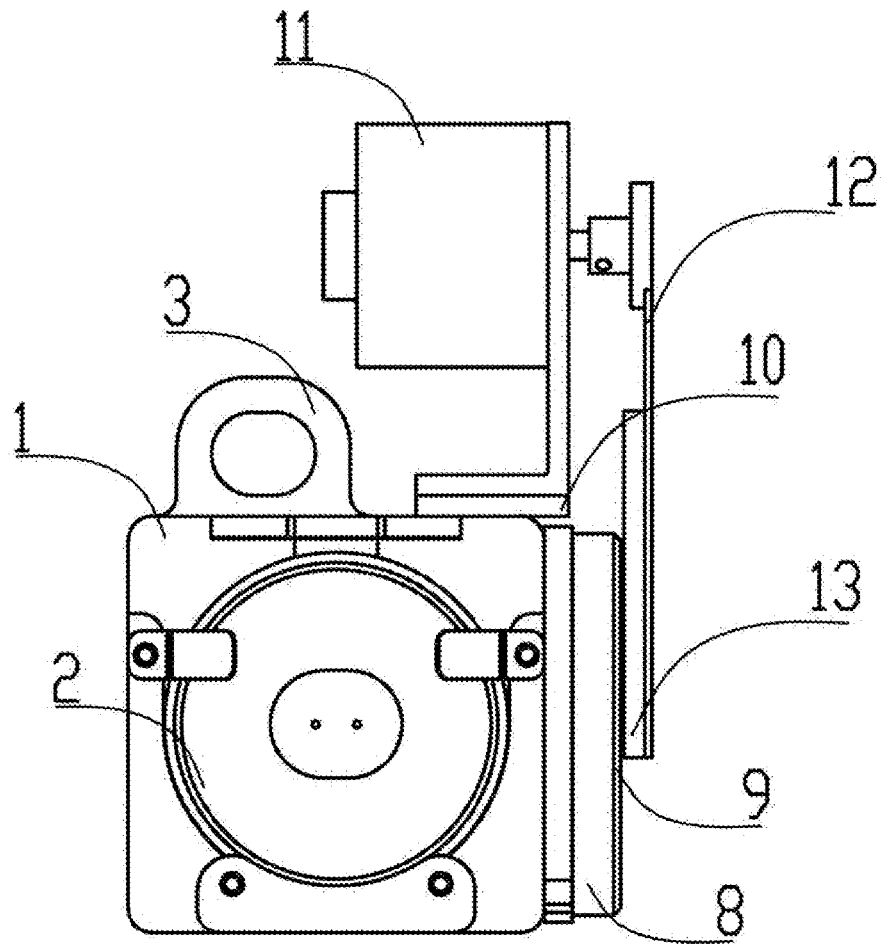
FIG. 5 shows a left view of an embodiment of the present disclosure.
Figure 6:
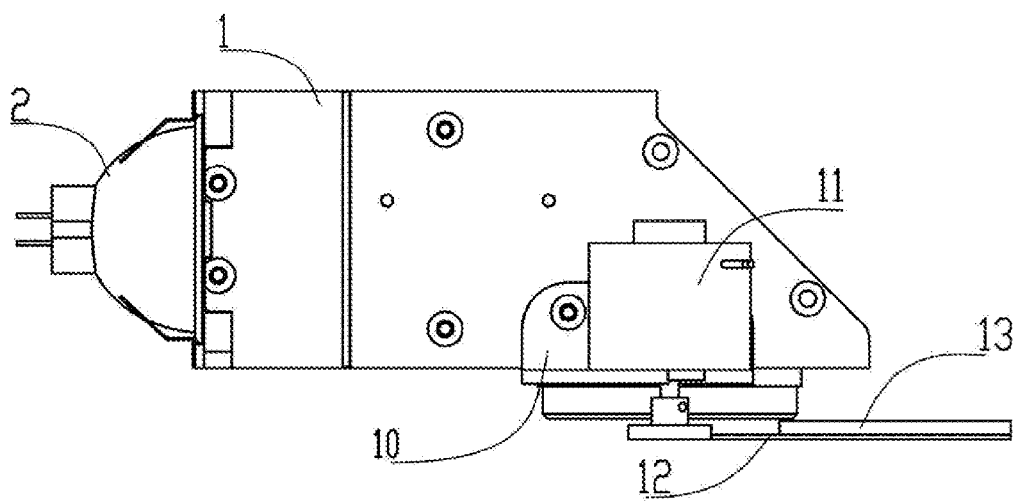
FIG. 6 shows a top view of an embodiment of the present disclosure.

The present disclosure provides a light concentrating device for inspecting internal quality of fruits and vegetables, of which the structural schematic view is shown in FIG. 2, and which comprises a housing 1, a halogen lamp 2, a diaphragm 3, a planoconvex lens holder 4, a first planoconvex lens 5, a reflector fixing plate 6, a reflector 7, a planoconvex lens fixing plate 8, and a second planoconvex lens 9. The housing 1 is a sealed opaque shell and is made of aluminum alloy, wherein the bearing capacity of the housing 1 for mounting and fixing points is reduced, and the good thermal conductivity of a metal alloy is utilized, such that the heat in the housing 1 can be quickly dissipated. The halogen lamp 2 is fixedly mounted on the left end of the housing 1, and the halogen lamp 2 extends into the interior of the housing 1, wherein the adoption of a mounting mode of an extend-in type can avoid the influence of external light on the device during mounting, and ensure the reliability of the mounting. The selection and use of a halogen lamp 2 with a power of 100 W can both ensure that light spots having sufficient brightness are formed when light rays are concentrated on fruits, and ensure that the luminous intensity of the light rays would not scorch the fruits. The right side of the halogen lamp 2 is provided with a pluggable diaphragm 3 for guiding the direction of the light rays of the halogen lamp 2, and the diaphragm 3 penetrates the interior of the housing 1, wherein an aperture on the diaphragm 3 is utilized to limit the light rays passing through the diaphragm 3, such that the light rays show an obvious light spot outline on the fruits, while the design of the pluggable diaphragm 3 enables the device to form a light spot on fruits of different diameters that meets the internal quality inspection conditions of fruits, and the diaphragm 3 penetrating the interior of the housing 1 can also sufficiently ensure that the light rays emitted by the halogen lamp 2 can only emerge through the aperture on the diaphragm 3, while concentrating the light rays. The planoconvex lens holder 4 is fixedly mounted in the housing 1 on the right side of the diaphragm 3, and the first planoconvex lens 5 for primary concentration of light rays is mounted on the planoconvex lens holder 4, wherein the fixedly mounted planoconvex lens holder 4 permits vertical arrangement of the first planoconvex lens 5 in the housing 1, which greatly ensures that the first planoconvex lens 5 having a concentrating effect on light rays can make the light rays better projected on subsequent component for light ray processing. The reflector fixing plate 6 is fixedly mounted on the right side of the first planoconvex lens 5, the reflector 7 for reflecting light rays is mounted on the reflector fixing plate 6, the planoconvex lens fixing plate 8 is fixedly mounted under the reflector 7, the second planoconvex lens 9 for secondary concentration of light rays is mounted on the planoconvex lens fixing plate 8, and the second planoconvex lens 9 extends out of the housing, wherein through the reflector 7 on the obliquely mounted reflector fixing plate 6, the light rays passing through the first planoconvex lens 5 better irradiate the second planoconvex lens 9, the light passing by the reflector 7 vertically irradiates the second planoconvex lens 9, and the second planoconvex lens 9 concentrates the light rays reflected by the reflector 7, such that the light rays can form light spots with sufficient intensity on the surface of fruits, such that a subsequent detection device can detect the light spot signal on the fruits.

Optionally, as shown in the external view 1 of an embodiment of the present disclosure, in the front view 4 of an embodiment of the present disclosure, in the left view 5 of an embodiment of the present disclosure, and in the top view 6 of an embodiment of the present disclosure, the light concentrating device for inspecting internal quality of fruits and vegetables further comprises: a fixing plate 10, a motor 11, a shading plate 12, and a thermal baffle 13, wherein the fixing plate 10 is mounted on the external surface of the housing 1, the motor 11 is fixedly mounted on the fixing plate 10, the shading plate 12 configured for shielding light rays of secondary concentration is in connection with the output shaft of the motor 11, and the thermal baffle 13 is mounted on the shading plate 12. In the device, the shading plate 12 can be driven to swing through the movement of the motor 11. When the light rays are too intensive or the fruit conveying device stops working, a corresponding electric signal can be sent to the motor 11 through a motor control device, the motor 11 is utilized to drive the thermal baffle 13 on the shading plate 12 to move to a designated position, and the thermal baffle 13 is used to block the irradiation of light rays on fruits. In this way, not only the occurrence of situation where the lighting device is switched off to protect the fruits is avoided, but it can also be ensured that fruits would not be scorched or damaged by the light rays. In the present embodiment, a motor 11 of the type X2216 and a thermal insulating fiberboard 13 are used, and the above shading process can be realized more stably.

The present disclosure further provides a light concentrating device for inspecting internal quality of fruits and vegetables, of which the structural schematic view is shown in FIG. 2, and which comprises a housing 1, a halogen lamp 2, a diaphragm 3, a planoconvex lens holder 4, a first planoconvex lens 5, a reflector fixing plate 6, a reflector 7, a planoconvex lens fixing plate 8, and a second planoconvex lens 9. The housing 1 is a sealed opaque shell and the housing 1 is made of stainless steel, wherein the bearing capacity of the housing 1 for mounting and fixing points is reduced, and the good thermal conductivity of a metal alloy is utilized, such that the heat in the housing 1 can be quickly dissipated. The halogen lamp 2 is fixedly mounted on the left end of the housing 1, and the halogen lamp 2 extends into the interior of the housing 1, wherein the adoption of a mounting mode of an extend-in type can avoid the influence of external light on the device during mounting, and ensure the reliability of the mounting. The selection and use of a halogen lamp 2 with a power of 70 W can both ensure that light spots having sufficient brightness are formed when light rays are concentrated on fruits, and ensure that the luminous intensity of the light rays would not scorch the fruits. The right side of the halogen lamp 2 is provided with a pluggable diaphragm 3 for guiding the direction of the light rays of the halogen lamp 2, and the diaphragm 3 penetrates the interior of the housing 1, wherein an aperture on the diaphragm 3 is utilized to limit the light rays passing through the diaphragm 3, such that the light rays show an obvious light spot outline on the fruits, while the design of the pluggable diaphragm 3 enables the device to form a light spot on fruits of different diameters that meets the internal quality inspection conditions of fruits, and the diaphragm 3 penetrating the interior of the housing 1 can also sufficiently ensure that the light rays emitted by the halogen lamp 2 can only emerge through the aperture on the diaphragm 3, while concentrating the light rays. The planoconvex lens holder 4 is fixedly mounted in the housing 1 on the right side of the diaphragm 3, and the first planoconvex lens 5 for primary concentration of light rays is mounted on the planoconvex lens holder 4, wherein the fixedly mounted planoconvex lens holder 4 permits vertical arrangement of the first planoconvex lens 5 in the housing 1, which greatly ensures that the first planoconvex lens 5 having a concentrating effect on light rays can make the light rays better projected on subsequent component for light ray processing. The reflector fixing plate 6 is fixedly mounted on the right side of the first planoconvex lens 5, the reflector 7 for reflecting light rays is mounted on the reflector fixing plate 6, the planoconvex lens fixing plate 8 is fixedly mounted under the reflector 7, the second planoconvex lens 9 for secondary concentration of light rays is mounted on the planoconvex lens fixing plate 8, and the second planoconvex lens 9 extends out of the housing, wherein through the reflector 7 on the obliquely mounted reflector fixing plate 6, the light rays passing through the first planoconvex lens 5 better irradiate the second planoconvex lens 9, the light passing by the reflector 7 vertically irradiates the second planoconvex lens 9, and the second planoconvex lens 9 concentrates the light rays reflected by the reflector 7, such that the light rays can form light spots with sufficient intensity on the surface of fruits, such that a subsequent detection device can detect the light spot signal on the fruits.

Optionally, as shown in the external view 1 of an embodiment of the present disclosure, in the front view 4 of an embodiment of the present disclosure, in the left view 5 of an embodiment of the present disclosure, and in the top view 6 of an embodiment of the present disclosure, the light concentrating device for inspecting internal quality of fruits and vegetables further comprises: a fixing plate 10, a motor 11, a shading plate 12, and a thermal baffle 13, wherein the fixing plate 10 is mounted on the external surface of the housing 1, the motor 11 is fixedly mounted on the fixing plate 10, the shading plate 12 configured for shielding light rays of secondary concentration is in connection with the output shaft of the motor 11, and the thermal baffle 13 is mounted on the shading plate 12. In the device, the shading plate 12 can be driven to swing through the movement of the motor 11. When the light rays are too intensive or the fruit conveying device stops working, a corresponding electric signal can be sent to the motor 11 through a motor control device, the motor 11 is utilized to drive the thermal baffle 13 on the shading plate 12 to move to a designated position, and the thermal baffle 13 is used to block the irradiation of light rays on fruits. In this way, not only the occurrence of situation where the lighting device is switched off to protect the fruits is avoided, but it can also be ensured that fruits would not be scorched or damaged by the light rays. In the present embodiment, a motor 11 of the type X2212 and a thermal insulating asbestos board 13 are used, and the above shading process can be realized more stably.

The working principle diagram of an embodiment of the present disclosure is shown in the figure: Before using the device, the device is firstly mounted and placed above a conveyor belt for transporting fruits; and after adjusting the distance between the device and the conveyor belt, the power supply of the halogen lamp 2 is switched on, and it is ensured that the halogen lamp 2 can work normally. When the light rays of the halogen lamp 2 pass through the pluggable diaphragm 3, the concentration of the light rays 15 is completed after that the light rays 15 pass through the aperture on the diaphragm 3. Subsequently, the light rays 15 are concentrated by the first planoconvex lens 5, and under the light reflecting effect of the reflector 7, the light rays 15 are concentrated by the second planoconvex lens 9 on the surface of fruits 14 and form light spots. When the fruit conveying device stops, the lamplight of the halogen lamp 2 would irradiate the surface of the fruits for a long time, which would damage the fruits 14; at this moment, an electric signal is inputted by the sensor of the detection device to the motor 11 on the fixing plate 10, such that the motor 11 drives the thermal baffle 13 on the shading plate 12 to move, and the motor 11 stops moving when the thermal baffle 13 moves to a position between the second planoconvex lens 9 and the fruits 14, and at that time, the thermal baffle 13 blocks the light rays 15 passing by the second planoconvex lens 9, hereby avoiding irradiation of the light rays 15 on the fruits 14 for a long time, and ensuring that the appearance of the fruits 14 would not be scorched and damaged by the light rays 15.

The detection device is usually composed of STM32, ARM single chip microcomputer, or PLC or the like; a control program is loaded into the detection device through the principal computer, an optical signal collected by optical fibers is inputted into the detection device and then judged by an internal program of the detection device, finally, the results of internal quality analysis of fruits are uploaded to the principal computer, and fruits with damaged internal quality are correspondingly counted and marked.

The halogen lamp 2, the diaphragm 3, the planoconvex lens holder 4, the first planoconvex lens 5, the reflector 7, the second planoconvex lens 9, the motor 11, and the thermal baffle 13 are common components in the prior art in the related field, and the connection structure and the working principle thereof are all mature technologies in the field, thus, no repetitive description will be made here.

The main technical features, basic principles, and related advantages of the present disclosure are described above. For a person skilled in the art, it could be clear that the present disclosure is not limited to the details of the foregoing exemplary embodiments, and the present disclosure can be embodied in another specific form without departing from the concept or the basic features of the present disclosure. Therefore, no matter from which point of view, the embodiments should be regarded as exemplary and non-limiting, and the scope of the present disclosure is defined by the appended claims, rather than the above description, and therefore it is intended to cover all changes falling within the meaning and scope of the equivalent elements of the claims in the present disclosure.

In addition, it shall be understood that although the present description is described based on the embodiments, not every embodiment only includes one individual technical solution; the description is narrated in a way for the purpose of clarity, and a person skilled in the art shall deem the description as a whole, and the technical solutions of the respective embodiments may also be combined with each other in an appropriate way, so as to form further embodiments that could be understandable for a person skilled in the art.

INDUSTRIAL APPLICABILITY

In the present disclosure, by improving existing devices for inspecting fruits and vegetables, the device is enabled to be suitable for industrial, large-scale production and packaging of fruits, and achieve the purpose of continuously measuring the internal quality of fruits. By changing different pluggable diaphragms, the device changes the size of light spots formed by light rays projected on the surface of fruits, such that the device can have a better light concentrating effect when inspecting the same kind of fruits having different sizes, while a relatively high inspection accuracy of the device is ensured, and the occurrence of situation where the device cannot adjust light concentration according to the diameter grades of different fruits during the automatic inspection process is avoided. The light concentration for two times realized by utilizing a planoconvex lens enable light rays to form light spots having clear brightness effects on fruits, which effectively avoids the occurrence of situation where the sensor cannot detect an effective light spot signal due to a poor light concentrating effect.

In a word, the device of the present disclosure avoids the occurrence of situation of manual inspection of fruits, improves the efficiency of internal quality inspection of fruits, and solves the problem that an existing inspection device cannot measure the internal quality of fruits during the large-scale packaging and production of fruits; at the same time, changes in inspection accuracy caused by manual operation of inspection instrument for a long time are avoided, hereby achieving the purpose of inspecting the internal quality of fruits in real time during large-scale fruit production, and economizing manpower and material resources.

The invention claimed is:

1. A light concentrating device for inspecting internal quality of fruits and vegetables, comprising: a housing, a halogen lamp, a diaphragm, a planoconvex lens holder, a first planoconvex lens, a reflector fixing plate, a reflector, a planoconvex lens fixing plate, and a second planoconvex lens, wherein the housing is a sealed opaque shell, the halogen lamp is fixedly mounted on a left end of the housing, the halogen lamp extends into an interior of the housing, a right side of the halogen lamp is provided with a pluggable diaphragm configured to guide a direction of light rays of the halogen lamp, the diaphragm passes through the interior of the housing, the planoconvex lens holder is fixedly mounted in the housing on a right side of the diaphragm, the first planoconvex lens for primary concentration of light rays is mounted on the planoconvex lens holder, the reflector fixing plate is fixedly mounted on a right side of the first planoconvex lens, the reflector configured to reflect light rays is mounted on the reflector fixing plate, the planoconvex lens fixing plate is fixedly mounted under the reflector, the second planoconvex lens for secondary concentration of light rays is mounted on the planoconvex lens fixing plate, and the second planoconvex lens extends out of the housing.

2. The light concentrating device for inspecting internal quality of fruits and vegetables according to claim 1, further comprising: a fixing plate, a motor, a shading plate, and a thermal baffle, wherein the fixing plate is mounted on an external surface of the housing, the motor is fixedly mounted on the fixing plate, the shading plate configured for shielding light rays of the secondary concentration is in connection with an output shaft of the motor, and the thermal baffle is mounted on the shading plate.

3. The light concentrating device for inspecting internal quality of fruits and vegetables according to claim 1, wherein the housing is made of aluminum alloy.

4. The light concentrating device for inspecting internal quality of fruits and vegetables according to claim 2, wherein the thermal baffle is a thermal insulating fiberboard.

5. The light concentrating device for inspecting internal quality of fruits and vegetables according to claim 1, wherein the housing is made of a metal.

6. The light concentrating device for inspecting internal quality of fruits and vegetables according to claim 1, wherein the housing is made of stainless steel.

7. The light concentrating device for inspecting internal quality of fruits and vegetables according to claim 2, wherein the thermal baffle is a thermal insulating asbestos board.

8. The light concentrating device for inspecting internal quality of fruits and vegetables according to claim 1, wherein the halogen lamp has a power no less than 70 W.

9. The light concentrating device for inspecting internal quality of fruits and vegetables according to claim 1, wherein the diaphragm is provided with an aperture, so as to be able to limit and focus light emitted by the halogen lamp.

10. The light concentrating device for inspecting internal quality of fruits and vegetables according to claim 1, wherein the reflector is mounted in an oblique manner, so as to be able to reflect light rays passing through the first planoconvex lens, such that the light rays vertically irradiate the second planoconvex lens.

11. A system for inspecting internal quality of fruits and vegetables, wherein the system comprises a detection device and a light concentrating device for inspecting internal quality of fruits and vegetables according to claim 1, wherein the detection device is configured to perform corresponding optical signal detection for light spots irradiated on a fruit, and accordingly judge whether the fruit has a quality problem inside.

12. The system for inspecting internal quality of fruits and vegetables according to claim 11, wherein the inspection device further comprises a detection device sensor, wherein the detection device sensor is configured to input an electric signal to the motor when detecting that lamplight from the halogen lamp irradiates a surface of the fruit for a long time, such that the motor drives the shading plate and the thermal baffle to move, and the motor stops moving after that the shading plate and the thermal baffle are moved to a position between the second planoconvex lens and the fruit, such that the shading plate and the thermal baffle block light rays having passed through the second planoconvex lens.

13. The system for inspecting internal quality of fruits and vegetables according to claim 11, wherein the detection device is composed of STM32, ARM single chip microcomputer, or PLC.

14. The system for inspecting internal quality of fruits and vegetables according to claim 11, wherein a control program is loaded into the detection device, and the control program is used to judge an optical signal collected by the detection device, so as to determine whether the fruit has a quality problem inside.

15. The system for inspecting internal quality of fruits and vegetables according to claim 11, wherein the system for inspecting internal quality of fruits and vegetables further comprises a principal computer, wherein the principal computer is configured to correspondingly count and mark fruits having damaged internal quality.

16. A method for inspecting internal quality of fruits and vegetables, wherein the light concentrating device for inspecting internal quality of fruits and vegetables according to claim 1 is mounted next to a conveying device for transporting the fruits; a power supply of the halogen lamp is switched on, such that light rays emitted by the halogen lamp pass through the diaphragm, are then focused by the first planoconvex lens, and pass through the second planoconvex lens after passing by the reflector and are then focused on a surface of the fruits; and corresponding optical signal detection is performed for light spots irradiated on the fruits through a detection device, hereby judging whether the fruits have a quality problem inside.

17. The method for inspecting internal quality of fruits and vegetables according to claim 16, wherein the method further comprises: inputting an electric signal to a motor when a detection device sensor detects that lamplight irradiates the surface of the fruits for a long time, such that the motor drives a shading plate and a thermal baffle to move, and the motor stops moving after that the shading plate and the thermal baffle move to a position between the second planoconvex lens and a fruit, such that the shading plate and the thermal baffle block light rays having passed through the second planoconvex lens, hereby ensuring that an appearance of the fruit would not be scorched and damaged by the light rays.

18. The method for inspecting internal quality of fruits and vegetables according to claim 16, wherein the method further comprises using a principal computer, which is configured to correspondingly count and mark fruits having damaged internal quality.

19. The light concentrating device for inspecting internal quality of fruits and vegetables according to claim 2, wherein the halogen lamp has a power no less than 70 W.

20. The light concentrating device for inspecting internal quality of fruits and vegetables according to claim 2, wherein the diaphragm is provided with an aperture, so as to be able to limit and focus light emitted by the halogen lamp.

* * * * *